United States Patent
Yang et al.

(10) Patent No.: US 11,148,674 B2
(45) Date of Patent: Oct. 19, 2021

(54) METHOD AND APPARATUS FOR ACQUIRING CONTROL AMOUNT FOR PERFORMANCE TEST OF UNMANNED VEHICLE

(71) Applicant: BAIDU ONLINE NETWORK TECHNOLOGY (BEIJING) CO., LTD., Beijing (CN)

(72) Inventors: Chen Yang, Beijing (CN); Dun Luo, Beijing (CN); Jiming Mao, Beijing (CN); Fangfang Dong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 298 days.

(21) Appl. No.: 16/278,672

(22) Filed: Feb. 18, 2019

(65) Prior Publication Data
US 2019/0389474 A1 Dec. 26, 2019

(30) Foreign Application Priority Data
Jun. 26, 2018 (CN) .......................... 201810672885.8

(51) Int. Cl.
*B60W 40/10* (2012.01)
*B60W 50/00* (2006.01)

(52) U.S. Cl.
CPC ..... *B60W 40/10* (2013.01); *B60W 2050/0028* (2013.01); *B60W 2520/06* (2013.01); *B60W 2520/105* (2013.01); *B60W 2520/125* (2013.01)

(58) Field of Classification Search
None
See application file for complete search history.

(56) References Cited

U.S. PATENT DOCUMENTS 1,040,726 A * 10/1912 Milligan et al. ............ 220/258.4
4,809,178 A * 2/1989 Ninomiya ............ G05D 1/0255
318/587

(Continued)

FOREIGN PATENT DOCUMENTS

CN 104933228 A 9/2015
CN 105699095 A * 6/2016

(Continued)

OTHER PUBLICATIONS

Winter, Stephan Automated Urban Travel Interpretation: A Bottom-up Approach for Trajectory Segmentation, Nov. 23, 2016, Sensors (Basel, Switzerland, 16(11), pp. 3, 6, and 7 (Year: 2016).*

(Continued)

*Primary Examiner* — Tuan C To
(74) *Attorney, Agent, or Firm* — J.C. Patents

(57) ABSTRACT

Provided are a method and an apparatus for acquiring a control amount for a performance test of an unmanned vehicle, including: acquiring coordinates of y key points on a trajectory of a simulated obstacle vehicle and speeds at the y key points, where y≥2; acquiring trajectory equations of the obstacle vehicle between every two adjacent key points according to the coordinates of the y key points, where the trajectory equation is an $n^{th}$ degree polynomial equation, n≥2; acquiring accelerations of the obstacle vehicle between every two adjacent key points according to speeds at the y key points and a trajectory curve corresponding to the trajectory equation; for each running duration, according to the accelerations, acquiring a dynamic attribute and a coordinate when the obstacle vehicle has run for the running duration according to trajectories corresponding to the trajectory equations.

20 Claims, 5 Drawing Sheets

(56) References Cited

U.S. PATENT DOCUMENTS

| | | | |
|---|---|---|---|
| 9,194,168 B1* | 11/2015 | Lu | B60R 25/24 |
| 9,317,033 B2* | 4/2016 | Ibanez-Guzman | B60W 60/0025 |
| 9,494,439 B1* | 11/2016 | Ross | G05D 1/0027 |
| 10,303,173 B2* | 5/2019 | Rander | B60W 30/00 |
| 11,016,500 B2* | 5/2021 | Zhang | B60W 30/10 |
| 2015/0248131 A1* | 9/2015 | Fairfield | G05D 1/0011 701/2 |
| 2015/0379437 A1* | 12/2015 | Reich | G06Q 10/02 705/5 |
| 2016/0061612 A1* | 3/2016 | You | G01S 19/13 701/409 |
| 2016/0125735 A1* | 5/2016 | Tuukkanen | G08G 1/202 701/23 |
| 2016/0280265 A1* | 9/2016 | Hass | B62D 15/0265 |
| 2017/0120803 A1* | 5/2017 | Kentley | B60W 10/18 |
| 2017/0254906 A1 | 9/2017 | Gowda et al. | |

FOREIGN PATENT DOCUMENTS

| | | |
|---|---|---|
| CN | 106063711 A | 11/2016 |
| CN | 107024356 A | 8/2017 |
| CN | 107063711 A | 8/2017 |
| CN | 107515607 A | 12/2017 |
| CN | 107991898 A * | 5/2018 |
| CN | 107992016 A * | 5/2018 |
| DE | 102015224033 A1 | 3/2017 |

OTHER PUBLICATIONS

Rogers, Robert Applied Mathematics in Integrated Navigation Systems, Oct. 26, 2007, American Institute of Aeronautics and Astronautics, Inc., Third Edition, Book Description (Year: 2007).*
The Chinese First Examination Report of corresponding Chinese application No. 201810672885.8, dated Jul. 22, 2019.

* cited by examiner

__US 11,148,674 B2__

METHOD AND APPARATUS FOR ACQUIRING CONTROL AMOUNT FOR PERFORMANCE TEST OF UNMANNED VEHICLE

CROSS-REFERENCE TO RELATED APPLICATIONS

This application claims priority to Chinese Patent Application No. 201810672885.8, filed on Jun. 26, 2018, which is hereby incorporated by reference in its entirety.

TECHNICAL FIELD

The present application relates to an unmanned driving technology, and in particular, to a method and an apparatus for acquiring a control amount for a performance test of an unmanned vehicle.

BACKGROUND

An unmanned vehicle test process includes a stage for testing special and extreme road conditions. In this stage, a tester constructs a complex test scenario, i.e. constructs the test scenario of the unmanned vehicle by setting a trajectory of an obstacle vehicle and setting dynamic attributes of the obstacle vehicle at multiple key points on its trajectory (the dynamic attributes include but are not limited to a magnitude of the speed and a direction of the speed), and obtains coordinates and dynamic attributes of the obstacle vehicle corresponding to multiple running lengths when the obstacle vehicle is running according to a set running trajectory under the test scenario, to be used as input data of the performance of the unmanned vehicle, that is, a control amount for the performance test of the unmanned vehicle.

In prior art, the obstacle vehicle is in accordance with the set running trajectory and the dynamic attributes of the set obstacle vehicle at a plurality of key points on its running trajectory, thus when the obstacle vehicle runs according to the set running trajectory, the dynamic attributes of the obstacle vehicle change discontinuously, for example, a sudden change in the magnitude of the speed and the direction of the speed, especially at key points, the discontinuous change of the dynamic attributes of the obstacle vehicle will result in false judgment on the perception and control of the unmanned vehicle during the performance test of the unmanned vehicle, as well as a low reliability in the performance test of the unmanned vehicle.

SUMMARY

Embodiments of the present application provide a method and an apparatus for acquiring a control amount for a performance test of an unmanned vehicle, so as to overcome the technical problem that the reliability of the performance test of the unmanned vehicle in the prior art is low.

In a first aspect, embodiments of the present application provide a method for acquiring a control amount for a performance test of an unmanned vehicle, including:
acquiring coordinates of y key points on the trajectory of the simulated obstacle vehicle and speeds at the y key points, where $y \geq 2$;
acquiring trajectory equations of the obstacle vehicle between every two adjacent key points according to the coordinates of they key points, where the trajectory equation is an $n^{th}$ degree polynomial equation, $n \geq 2$;
acquiring accelerations of the obstacle vehicle between every two adjacent key points according to the speeds at the y key points and the trajectory curves corresponding to the trajectory equations, if the speeds of the obstacle vehicle at two adjacent key points are not the same, the acceleration of the obstacle vehicle between the two adjacent key points is a constant that is not 0, if the speeds of the obstacle vehicle at the two adjacent key points are the same, the acceleration of the obstacle vehicle between the two adjacent key points is 0;
for each running duration, according to the accelerations, acquiring a dynamic attribute and a coordinate when the obstacle vehicle has run for the running duration according to trajectories corresponding to the trajectory equations.

In a possible design, where the acquiring trajectory equations of the obstacle vehicle between every two adjacent key points according to the coordinates of the y key points includes:
acquiring a first coordinate of a first shadow point of a first key point among the y key points, and a second coordinate of a second shadow point of a last key point among the y key points;
acquiring the trajectory equations of the obstacle vehicle between every two adjacent key points according to the coordinates of the y key points, the first coordinate and the second coordinate.

In a possible design, where the acquiring accelerations of the obstacle vehicle between every two adjacent key points according to the speeds at the y key points and trajectory curves corresponding to the trajectory equations includes:
acquiring lengths of the trajectory curves corresponding to the trajectory equations;
acquiring running durations of the obstacle vehicle between every two adjacent key points according to the speeds of the obstacle vehicle at the y key points and the lengths of the trajectory curves;
acquiring accelerations of the obstacle vehicle between every two adjacent key points according to the running durations and the speeds of the obstacle vehicle at they key points.

In a possible design, if the dynamic attribute includes a speed, where the for each running duration, according to the accelerations, acquiring a dynamic attribute when the obstacle vehicle has run for the running duration according to trajectories corresponding to the trajectory equations includes:
for each running duration, determining that, when the obstacle vehicle has run for the running duration, the obstacle vehicle is between a first key point and a second key point and is running according to a target trajectory corresponding to a target trajectory equation between the first key point and the second key point, where the first key point and the second key point are two adjacent points among they key points;
determining a target duration for which the obstacle vehicle has run according to the target trajectory;
acquiring a speed of the obstacle vehicle when the obstacle vehicle has run for the running duration according to the speed of the obstacle vehicle at the first key point, the acceleration between the first key point and the second key point, and the target duration.

In a possible design, where the for each running duration, according to the accelerations, acquiring a coordinates when the obstacle vehicle has run for the running duration according to trajectories corresponding to the trajectory equations includes:

obtaining, according to the speed of the obstacle vehicle at the first key point and the target duration, a target distance that the obstacle vehicle has run according to the target trajectory;

acquiring a ratio of the target distance to a length of a target trajectory curve, where the length of the target trajectory curve is a length of a trajectory curve corresponding to the target trajectory equation;

acquiring, according to the ratio and the target trajectory equation, the coordinate of the obstacle vehicle when the obstacle vehicle has run for the running duration.

In a possible design, the trajectory equation between an x-th key point and an (x+1)-th key point is:

$$\mathrm{Traj}_x(r)=c_0^x+c_1^x r+c_2^x r^2+c_3^x r^3$$

where, $r$ represents a running ratio, and the running ratio is the ratio of the distance that the obstacle vehicle has run according to the trajectory between the x-th key point and the (x+1)-th key point to a length of the trajectory curve corresponding to the trajectory of the obstacle vehicle between the x-th key point and the (x+1)-th key point, the x-th key point is adjacent to the (x+1)-th key point; $c_0^x=P_x$, $P_x$ is a coordinate of the x-th key point, $c_1^x=-\delta\times P_{x-1}+\delta\times P_{x+1}$, $P_{x-1}$ is the coordinate of the (x−1)-th key point, $P_{x+1}$ is a coordinate of the (x+1)-th key point, $c_2^x=2\delta\times P_{x-1}-(3-\delta)\times P_x+(3-2\delta)\times P_{x+1}-\delta\times P_{x+2}$, $P_{x+2}$ is a coordinate of the (x+2)-th key point, and $\delta$ is a tension coefficient, $0<\delta<1$; $P_0$ is the first coordinate, $P_{y+1}$ is the second coordinate, $x=1, 2 \ldots, y-1$.

In a possible design, where the acquiring lengths of the trajectory curves corresponding to the trajectory equations includes:

for every two adjacent key points: determining h sampling points on the trajectory curve corresponding to the trajectory equation between the two adjacent key points;

acquiring straight line distances between adjacent sampling points;

obtaining a length of the trajectory curve corresponding to the trajectory equation between the two adjacent key points according to a sum of the straight line distances.

In a possible design, where the acquiring running durations of the obstacle vehicle between every two adjacent key points according to the speeds of the obstacle vehicle at the y key points and the lengths of the trajectory curves includes:

acquiring the running durations of the obstacle vehicle between every two adjacent key points from the following formula:

$$T_x=(2\times S_x)/(u_x+u_{x+1})$$

where $T_x$ is the running duration of the obstacle vehicle between the x-th key point and the (x+1)-th key point, the x-th key point is adjacent to the (x+1)-th key point; $S_x$ is the length of the trajectory curve corresponding to the trajectory equation between the x-th key point and the (x+1)-th key point, $u_x$ is the speed of the obstacle vehicle at the x-th key point, and $u_{x+1}$ is the speed of the obstacle vehicle at the (x+1)-th key point, $x=1, 2, \ldots y-1$.

In a possible design, where the acquiring accelerations of the obstacle vehicle between the every adjacent key points according to the running durations and the speeds of the obstacle vehicle at the y key points includes:

acquiring the accelerations of the obstacle vehicle between every two adjacent key points from the following formula:

$$a_x=(u_{x+1}-u_x)/T_x$$

where $a_x$ is the acceleration of the obstacle vehicle between the x-th key point and the (x+1)-th key point, the x-th key point is adjacent to the (x+1)-th key point, and $T_x$ is the running duration of the obstacle vehicle between the x-th key point and the (x+1)-th key point, $u_{x+1}$ is the speed of the obstacle vehicle at the (x+1)-th key point, and id, is the speed of the obstacle vehicle at the x-th key point, $x=1, 2, \ldots y-1$.

In a possible design, where the acquiring a first coordinate of a first shadow point of a first key point among the y key points includes:

obtaining the first coordinate according to a coordinate of the first key point and a coordinate of the second key point;

where the acquiring the second coordinate of the second shadow point of the last key point among the y key points, includes:

obtaining the second coordinate according to a coordinate of the last key point and a coordinate of a second to last key point.

In a second aspect, embodiments of the present application provide an apparatus for acquiring a control amount for a performance test of an unmanned vehicle, including:

a key point acquiring module, configured to acquire coordinates of y key points on the trajectory of the simulated obstacle vehicle and speeds at they key points, where $y\geq 2$;

a trajectory equation acquiring module, configured to acquire trajectory equations of the obstacle vehicle between every two adjacent key points according to the coordinates of they key points, wherein the trajectory equation is an $n^{th}$ degree polynomial equation, $n\geq 2$;

an acceleration acquiring module, configured to acquire accelerations of the obstacle vehicle between every two adjacent key points according to the speeds at the y key points and the trajectory curves corresponding to the trajectory equations, if the speeds of the obstacle vehicle at two adjacent key points are not the same, the acceleration of the obstacle vehicle between the two adjacent key points is a constant that is not 0, if the speeds of the obstacle vehicle at the two adjacent key points are the same, the acceleration of the obstacle vehicle between the two adjacent key points is 0;

a control amount acquiring module, configured to, for each running duration, according to the accelerations, acquire a dynamic attribute and a coordinate when the obstacle vehicle has run for the running duration according to trajectories corresponding to the trajectory equations.

In a possible design, the trajectory equation acquiring module is specifically configured to:

acquire a first coordinate of a first shadow point of a first key point among the y key points, and a second coordinate of a second shadow point of a last key point among the y key points;

acquire the trajectory equations of the obstacle vehicle between every two adjacent key points according to the coordinates of the y key points, the first coordinate and the second coordinate.

In a possible design, the acceleration acquiring module is specifically configured to:

acquire lengths of the trajectory curves corresponding to the trajectory equations;

acquire running durations of the obstacle vehicle between every two adjacent key points according to the speeds of the obstacle vehicle at the y key points and the lengths of the trajectory curves;

acquire accelerations of the obstacle vehicle between every two adjacent key points according to the running durations and the speeds of the obstacle vehicle at they key points.

In a possible design, if the dynamic attribute includes a speed, the control amount acquiring module is specifically configured to:

for each running duration, determine that, when the obstacle vehicle has run for the running duration, the obstacle vehicle is between a first key point and a second key point and is running according to a target trajectory corresponding to a target trajectory equation between the first key point and the second key point, wherein the first key point and the second key point are two adjacent points among the y key points;

determine a target duration for which the obstacle vehicle has run according to the target trajectory;

acquire a speed of the obstacle vehicle when the obstacle vehicle has run for the running duration according to the speed of the obstacle vehicle at the first key point, the acceleration between the first key point and the second key point, and the target duration.

In a possible design, the control amount acquiring module is further specifically configured to:

obtain, according to the speed of the obstacle vehicle at the first key point and the target duration, a target distance that the obstacle vehicle has run according to the target trajectory;

acquire a ratio of the target distance to a length of a target trajectory curve, where the length of the target trajectory curve is a length of a trajectory curve corresponding to the target trajectory equation;

acquire, according to the ratio and the target trajectory equation, the coordinate of the obstacle vehicle when the obstacle vehicle has run for the running duration.

In a possible design, the trajectory equation between an x-th key point and an (x+1)-th key point is:

$$Traj_x(r) = c_0^x + c_1^x r + c_2^x r^2 + c_3^x r^3$$

where, r represents a running ratio, and the running ratio is the ratio of the distance that the obstacle vehicle has run according to the trajectory between the x-th key point and the (x+1)-th key point to a length of the trajectory curve corresponding to the trajectory of the obstacle vehicle between the x-th key point and the (x+1)-th key point, the x-th key point is adjacent to the (x+1)-th key point; $c_0^x = P_x$, $P_x$ is a coordinate of the x-th key point, $c_1^x = -\delta \times P_{x-1} + \delta \times P_{x+1}$, $P_{x-1}$ is the coordinate of the (x−1)-th key point, $P_{x+1}$ is a coordinate of the (x+1)-th key point, $c_2^x = 2\delta \times P_{x-1} - (3-\delta) \times P_x + (3-2\delta) \times P_{x+1} - \delta \times P_{x+2}$, $P_{x+2}$ is a coordinate of the (x+2)-th key point, and $\delta$ is a tension coefficient, $0 < \delta < 1$; $P_0$ is the first coordinate, $P_{y+1}$ is the second coordinate, $x=1, 2 \ldots, y-1$.

In a possible design, the acceleration acquiring module is specifically configured to: for every two adjacent key points: determine h sampling points on the trajectory curve corresponding to the trajectory equation between the two adjacent key points;

acquire straight line distances between adjacent sampling points;

obtain the length of the trajectory curve corresponding to the trajectory equation between the two adjacent key points according to a sum of the straight line distances.

In a possible design, the acceleration acquiring module is specifically configured to:

acquire the running durations of the obstacle vehicle between every two adjacent key points from the following formula:

$$T_x = (2 \times S_x)/(u_x + u_{x+1})$$

where $T_x$ is the running duration of the obstacle vehicle between the x-th key point and the (x+1)-th key point, the x-th key point is adjacent to the (x+1)-th key point; $S_x$ is the length of the trajectory curve corresponding to the trajectory equation between the x-th key point and the (x+1)-th key point, id, is the speed of the obstacle vehicle at the x-th key point, and $u_{x+1}$ is the speed of the obstacle vehicle at the (x+1)-th key point, $x=1, 2, \ldots y-1$.

In a possible design, the acceleration acquiring module is specifically configured to:

acquire the accelerations of the obstacle vehicle between every two adjacent key points from the following formula:

$$a_x = (u_{x+1} - u_x)/T_x$$

where $\alpha_x$ is the acceleration of the obstacle vehicle between the x-th key point and the (x+1)-th key point, the x-th key point is adjacent to the (x+1)-th key point, and $T_x$ is the running duration of the obstacle vehicle between the x-th key point and the (x+1)-th key point, $u_{x+1}$ is the speed of the obstacle vehicle at the (x+1)-th key point, and $u_x$ is the speed of the obstacle vehicle at the x-th key point, $x=1, 2, \ldots y-1$.

In a possible design, the trajectory equation acquiring module includes:

obtaining the first coordinate according to a coordinate of the first key point and a coordinate of the second key point;

where the acquiring the second coordinate of the second shadow point of the last key point among the y key points, includes:

obtaining the second coordinate according to a coordinate of the last key point and a coordinate of a second to last key point.

In a third aspect, embodiments of the present application provide a non-volatile computer readable storage medium, where a computer program is stored in the non-volatile computer readable storage medium, and the computer program is executed by a processor to perform the method according to the first aspect and any possible design of the first aspect of the claims.

In a fourth aspect, embodiments of the present application provide an apparatus for acquiring a control amount for a performance test of an unmanned vehicle, including a processor and a memory, where the memory, configured to store a program;

the processor, configured to execute the program stored in the memory, the processor is configured to perform the method according to the first aspect and any possible design of the first aspect when the program is executed.

In the present application, by constructing an $n^{th}$ polynomial trajectory equation, $n \geq 2$, the direction of the speed of the obstacle vehicle during running can be continuously changed, and if the speeds of the obstacle vehicle at two adjacent key points are not the same, the acceleration of the obstacle vehicle between the two adjacent key points is a constant that is not 0, if the speeds of the obstacle vehicle at the two adjacent key points are the same, the acceleration of the obstacle vehicle between the two adjacent key points is 0, so that the magnitude of the speed of the obstacle vehicle can be continuously changed during the running, thus the dynamic attribute of the obstacle vehicle continuously changes, which is in accordance with the dynamic characteristics of the vehicle. The continuously changing dynamic attribute are used as the control amount in the performance test of the unmanned vehicle, therefore, false judgment on the perception and control of the unmanned vehicle rarely happens, and the reliability of the result of the performance test of the unmanned vehicle is improved.

BRIEF DESCRIPTION OF THE DRAWINGS

In order to more clearly illustrate the embodiments of the present application or the technical solutions in the prior art, the drawings used in the embodiments or the prior art description will be briefly described below. Obviously, the drawings in the following description are some embodiments of the present application, and other drawings can be obtained according to the drawings without any creative labor for those skilled in the art.

DETAILED DESCRIPTION OF THE EMBODIMENTS

In order to make the objective, technical scheme and advantage of the present application more clear, the technical solutions in the embodiments of the present application will be clearly and completely described in the following with reference to the accompanying drawings in the embodiments of the present application. It is obvious that the described embodiments are only a part of embodiments of the present application, not all embodiments of the present application. Based on the embodiments of the present application, all the other embodiments obtained by those of ordinary skill without any creative works are within the protection scope of the present application.

Figure 1:
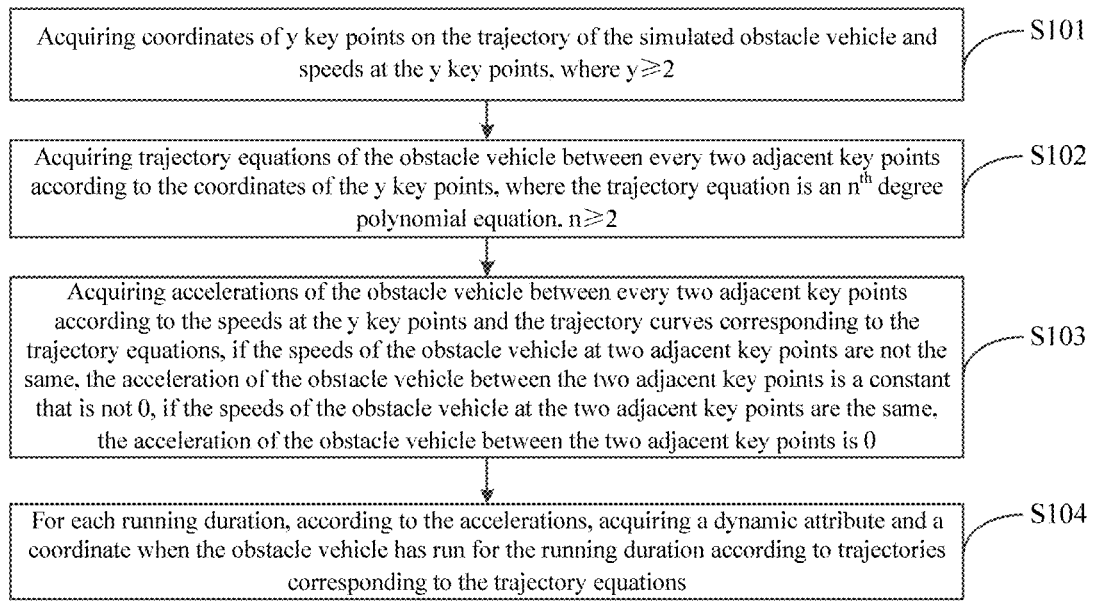
FIG. 1 is a flowchart of a method for acquiring a control amount for a performance test of an unmanned vehicle according to an embodiment of the present application.

FIG. 1 is a flowchart of a method for acquiring a control amount for a performance test of an unmanned vehicle according to an embodiment of the present application. As shown in FIG. 1, the method in this embodiment may include:

step S101: acquiring coordinates of y key points on the trajectory of the simulated obstacle vehicle and speeds at the y key points, where y≥2;

step S102: acquiring trajectory equations of the obstacle vehicle between every two adjacent key points according to the coordinates of the y key points, where the trajectory equation is an $n^{th}$ degree polynomial equation, n≥2;

step S103: acquiring accelerations of the obstacle vehicle between every two adjacent key points according to the speeds at the y key points and the trajectory curves corresponding to the trajectory equations, if the speeds of the obstacle vehicle at two adjacent key points are not the same, the acceleration of the obstacle vehicle between the two adjacent key points is a constant that is not 0, if the speeds of the obstacle vehicle at the two adjacent key points are the same, the acceleration of the obstacle vehicle between the two adjacent key points is 0;

step S104: for each running duration, according to the accelerations, acquiring a dynamic attribute and a coordinate when the obstacle vehicle has run for the running duration according to trajectories corresponding to the trajectory equations.

Specifically, the execution subject of this embodiment may be a terminal device.

For step S101: acquiring coordinates of y key points on the trajectory of the simulated obstacle vehicle and speeds at the y key points.

Specifically, the y key points are points which are set in the performance test scenario of the unmanned vehicle and by which the obstacle vehicle will pass, and the coordinates of the y key points and the speeds of the obstacle vehicle at the y key points are determined according to the performance of the unmanned vehicles that need to be tested. The coordinates of the y key points in this embodiment are three-dimensional coordinates.

Where the y key points can be expressed as $[Y_0, Y_1, Y_{y-1}]$, $Y_0$ represents a first key point, $Y_1$ represents a second key point, $Y_y$ represents an y-th key point, an x-th key point and an (x+1)-th key point are adjacent key points, x=1, 2 . . . , y−1.

Figure 2:
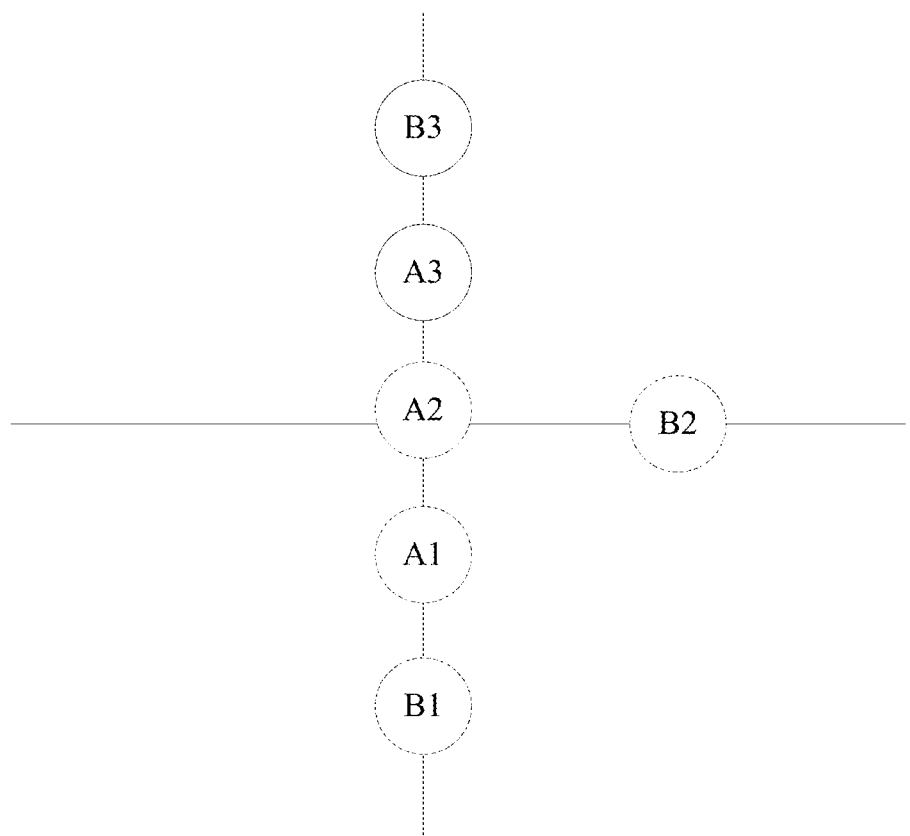
FIG. 2 is a schematic plan view of key point setting according to an embodiment of the present application.

FIG. 2 is a schematic plan view of key point setting according to an embodiment of the present application.

For example, it is necessary to test the performance of the unmanned vehicle in response to the sudden braking of the obstacle vehicle after overtaking. The setting plan of some key points among they key points can be as shown in FIG. 2, see FIG. 2, A1-A3 in FIG. 2 are the points by which the unmanned vehicle will pass. It is assumed that the unmanned vehicle passes through A1, A2, and A3 in turn, and setting positions of three key points among they key points may be positions of B1, B2, and B3, that is, Point B1, Point B2 and Point B3 are three of the y key points; that is, when the unmanned vehicle is at Point A1, the obstacle vehicle can be at B1, and when the unmanned vehicle is at Point A2, the obstacle vehicle can be at B2, when the unmanned vehicle is at point A3, the obstacle vehicle can be at B3; where the speed of Point B3 can be set to 0, the direction of the speed is arbitrary, and the speeds of points B1 and B2 are set to be greater than 0 and also greater than the speed of the unmanned vehicle. The above scenario is a scenario in which the obstacle vehicle suddenly brakes in front of the unmanned vehicle after the obstacle vehicle overtakes the unmanned vehicle, Point B1 and Point B2 are adjacent key points, and Point B2 and Point B3 are adjacent key points, if Point B2 is the x-th key point, Point B1 is the (x−1)-th key point, and Point B3 is the (x+1)-th key point.

That is to say, acquiring coordinates of the y key points on the trajectory of the simulated obstacle vehicle and the speeds at the y key points is acquiring the coordinates of the y key points and the speeds of the obstacle vehicle at the y key points determined according to the performance of the unmanned vehicle that need to be tested.

For step S102, acquiring trajectory equations of the obstacle vehicle between every two adjacent key points according to the coordinates of the y key points, where the trajectory equation is an $n^{th}$ degree polynomial equation, n≥2.

Specifically, two adjacent key points are two key points that the obstacle vehicle passes in turn during running, for example, the obstacle vehicle passes Key Point 1 at Time $t_1$, passes Key Point 2 at Time $t_2$, passes Key Point 3 at Time $t_3$, and passes no other key point between Time $t_1$ and Time $t_2$, and passes no other key points between Time $t_2$ and Time $t_3$, then Key Point 1 and Key Point 2 are adjacent key points. Key Point 2 and Key Point 3 are adjacent key points.

The specific process of "acquiring trajectory equations of the obstacle vehicle between every two adjacent key points according to the coordinates of the y key points" is as follows:

a: modeling trajectories between adjacent key points, the trajectory model of every two adjacent key points can be as follows:

$$\text{Traj}(r) = c_0 + c_1 r + c_2 r^2 + c_3 r^3$$

where, r represents a running ratio, the running ratio is a ratio of a distance that the obstacle vehicle has run according to the trajectory corresponding to the trajectory equation between the adjacent key points to a length of the trajectory curve corresponding to the trajectory equation between the adjacent key points; $c_0$, $c_1$, $c_2$ and $c_3$ are coefficients;

b: acquiring trajectory equations of the obstacle vehicle between every two adjacent key points according to the coordinates of they key points, that is, solving the coefficients $c_0$, $c_1$, $c_2$ and $c_3$.

where the trajectory equation between the x-th key point and the (x+1)-th key point can be expressed as:

$$\text{Traj}_x(r) = c_0^x + c_1^x r + c_2^x r^2 + c_3^x r^3$$

where, r represents a running ratio, and the running ratio is the ratio of the distance that the obstacle vehicle has run according to the trajectory between the x-th key point and the (x+1)-th key point to the length of the trajectory curve corresponding to the trajectory of the obstacle vehicle between the x-th key point and the (x+1)-th key point, the x-th key point is adjacent to the (x+1)-th key point, x=1, 2 . . . , y−1.

It can be understood that for every two adjacent key points, it is necessary to solve the corresponding coefficients, $c_0^x$, $c_1^x$, $c_2^x$, $c_3^x$, when solving, introduce boundary conditions: $\text{Traj}_x(0) = P_x$ (1), $\text{Traj}_x(1) = P_{x+1}$ (2), $\text{Traj}'_x(0) = \tan \text{gent}_x$ (3), $\text{Traj}'_x(1) = \tan \text{gent}_{x+1}$ (4), where, $\tan \text{gent}_x$ represents a cut vector of the x-th key point, $\tan \text{gent}_x = \delta(P_{x+1} - P_{x-1})$.

The above boundary condition is substituted into the trajectory equation between the x-th key point and the (x+1)-th key point, and the following solution is obtained:

$$c_0^x = P_x;$$

$$c_1^x = -\delta \times P_{x-1} + \delta \times P_{x+1};$$

$$c_2^x = 2\delta \times P_{x-1} - (3-\delta) \times P_x + (3-2\delta) \times P_{x+1} - \delta \times P_{x+2};$$

$$c_3^x = -\delta \times P_{x-1} + (2-\delta) \times P_x - (2-\delta) \times P_{x+1} + \delta \times P_{x+2};$$

Where $P_{x-1}$ is a coordinate of the (x−1)-th key point, $P_x$ is a coordinate of the x-th key point, $P_{x+1}$ is a coordinate of the (x+1)-th key point, and $P_{x+2}$ is a coordinate of the (x+2)-th key point.

When x=1, the coefficients of the trajectory equation between the first key point and the second key point are:

$$c_0^1 = P_1;$$

$$c_1^1 = -\delta \times P_0 + \delta \times P_2;$$

$$c_2^1 = 2\delta \times P_0 - (3-\delta) \times P_1 + (3-2\delta) \times P_2 - \delta \times P_3;$$

$$c_3^1 = -\delta \times P_0 \pm (2-\delta) \times P_1 - (2-\delta) \times P_2 + \delta \times P_3;$$

Here, $P_0$ appears, according to the above definition, $P_0$ should be a coordinate of the 0-th key point, but the 0-th key point does not exist, in this case, a first shadow point of the first key point can be obtained, the first shadow point is called the 0-th key point, and a first coordinate $P_0$ of the first shadow point can be $P_0 = 2 \times P_1 - P_2$, that is, the first coordinate is acquired according to the coordinate of the first key point and the coordinate of the second key point.

When x=y−1, the coefficients of the trajectory equation between the (y−1)-th key point and the y-th key point are:

$$c_0^{y-1} = P_{y-1};$$

$$c_1^{y-1} = -\delta \times P_{y-2} + \delta \times P_y;$$

$$c_2^{y-1} = 2\delta \times P_{y-2} - (3-\delta) \times P_{y-1} + (3-2\delta) \times P_y - \delta \times P_{y+1};$$

$$c_3^{y-1} = -\delta \times P_{y-1} \pm (2-\delta) \times P_y - (2-\delta) \times P_y + \delta \times P_{y+1};$$

Here, $P_{y+1}$ appears, according to the above definition, $P_{y+1}$ should be a coordinate of the (y+1)-th key point, but the (y+1)-th key point does not exist, in this case, a second shadow point of a last key point can be obtained, the second shadow point is called the (y+1)-th key point, and a second coordinate $P_{y+1}$ of the second shadow point may be $P_{y+1} = 2 \times P_y - P_{y-1}$, that is, the second coordinate is acquired according to the coordinate of the last key point and the coordinate of the second to last key point.

After the coefficients are solved, the trajectory process of the obstacle vehicle between every two adjacent key points is obtained. It can be understood that, in the case where the number of key points is y, y−1 trajectory equations can be obtained, and between every two adjacent key points, the obstacle vehicle runs according to the trajectory corresponding to the trajectory process between the adjacent key points.

Figure 3:
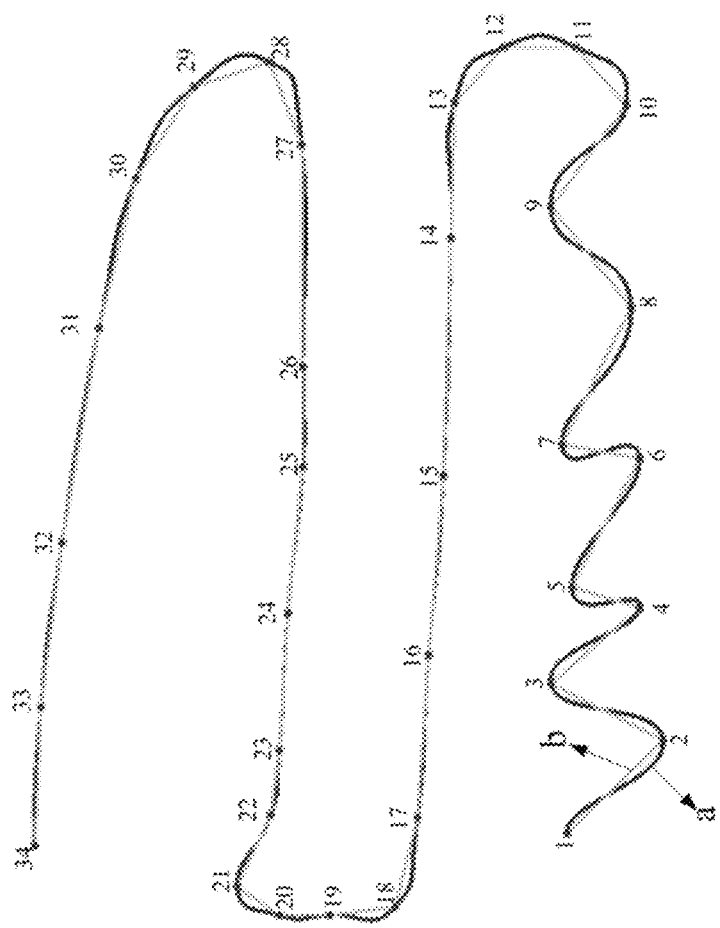
FIG. 3 is a schematic diagram of a trajectory of an obstacle vehicle according to an embodiment of the present application.

FIG. 3 is a schematic diagram of a trajectory of an obstacle vehicle according to an embodiment of the present application.

Referring to FIG. 3, 1-34 shown in the figures are all key points, Curve a is a trajectory curve corresponding to a trajectory equation constructed in this embodiment, and Curve b is a trajectory curve corresponding to a trajectory equation constructed in the prior art, and as can be seen from the comparison of Curve a and Curve b, the curvature of Curve a changes continuously without sudden changes in the direction of the speed at the key points.

That is, in this embodiment, the $n^{th}$ degree polynomial trajectory equation is constructed, n≥2, so that the obstacle vehicle does not suddenly change the direction of the speed at the key points.

For step S103, acquiring accelerations of the obstacle vehicle between every two adjacent key points according to the speeds at the y key points and the trajectory curves corresponding to the trajectory equations, if the speeds of the obstacle vehicle at two adjacent key points are not the same, the acceleration of the obstacle vehicle between the two adjacent key points is a constant that is not 0, if the speeds of the obstacle vehicle at the two adjacent key points are the same, the acceleration of the obstacle vehicle between the two adjacent key points is 0.

Specifically, the step includes:
- $b_1$: acquiring lengths of the trajectory curves corresponding to the trajectory equations;
- $b_2$: acquiring running durations of the obstacle vehicle between every two adjacent key points according to the speeds of the obstacle vehicle at the y key points and the lengths of the trajectory curves;
- $b_3$: acquiring accelerations of the obstacle vehicle between every two adjacent key points according to the running durations and the speeds of the obstacle vehicle at the y key points.

For $b_1$: acquiring lengths of the trajectory curves corresponding to the trajectory equations:

for every two adjacent key points:
- determining h sampling points on the trajectory curve corresponding to the trajectory equation between the two adjacent key points;
- acquiring straight line distances between adjacent sampling points;
- obtaining the length of the trajectory curve corresponding to the trajectory equation between the two adjacent key points according to a sum of the straight line distances.

Specifically, for every two adjacent key points, sampling is performed on a trajectory curve corresponding to a trajectory equation between two adjacent key points, and multiple sampling points are obtained, and the straight line distances between adjacent sampling points are acquired. The straight line distances are added up to obtain the length of the trajectory curve corresponding to the trajectory equation between the two adjacent key points.

It can be understood that the value of h should be as large as possible.

Figure 4:
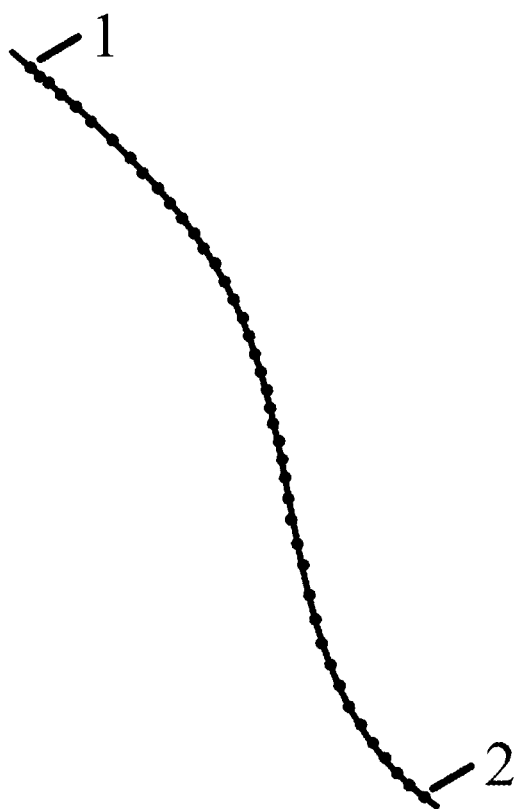
FIG. 4 is a schematic diagram of a distribution of sampling points according to an embodiment of the present application.

FIG. 4 is a schematic diagram of a distribution of sampling points according to an embodiment of the present application.

Referring to FIG. 4, the sampling points on the trajectory curve between the first key point and the second key point are shown in FIG. 4.

For $b_2$: the acquiring running durations of the obstacle vehicle between every two adjacent key points according to the speeds of the obstacle vehicle at they key points and the lengths of the trajectory curves includes:

acquiring the running durations of the obstacle vehicle between every two adjacent key points from formula I:

$$T_x = (2 \times S_x)/(u_x + u_{x+1}) \quad \text{Formula I}$$

where $T_x$ is the running duration of the obstacle vehicle between the x-th key point and the (x+1)-th key point, the x-th key point is adjacent to the (x+1)-th key point; $S_x$ is the length of the trajectory curve corresponding to the trajectory equation between the x-th key point and the (x+1)-th key point, $u_x$ is the speed of the obstacle vehicle at the x-th key point, and $u_{x+1}$ is the speed of the obstacle vehicle at the (x+1)-th key point, x=1, 2, ... y−1.

For $b_3$: the acquiring accelerations of the obstacle vehicle between the every adjacent key points according to the running durations and the speeds of the obstacle vehicle at the y key points includes:

acquiring the accelerations of the obstacle vehicle between every two adjacent key points from formula II:

$$a_x = (u_{x+1} - u_x)/T_x \quad \text{Formula II}$$

where $a_x$ is the acceleration of the obstacle vehicle between the x-th key point and the (x+1)-th key point, the x-th key point is adjacent to the (x+1)-th key point, and $T_x$ is the running duration of the obstacle vehicle between the x-th key point and the (x+1)-th key point, $u_{x+1}$ is the speed of the obstacle vehicle at the (x+1)-th key point, and $u_x$ is the speed of the obstacle vehicle at the x-th key point, x=1, 2, ... y−1.

It can be understood that if the speeds of the obstacle vehicle at the two adjacent key points are the same, the acceleration of the obstacle vehicle between the two adjacent key points is 0.

In this embodiment, if the speeds of the obstacle vehicle at two adjacent key points are not the same, the acceleration of the obstacle vehicle between the two adjacent key points is a constant that is not 0, indicating that the obstacle vehicle is in a uniform acceleration motion or a uniform deceleration motion between the two adjacent key points, so the obstacle vehicle will not suddenly change the speed during running. Similarly, if the speed of the obstacle vehicle is the same at two adjacent key points, the acceleration of the obstacle vehicle between the two adjacent key points is 0, indicating that the obstacle vehicle is in a uniform motion between the two adjacent key points, so the obstacle vehicle will not suddenly change the speed during running.

For step S104, for each running duration, according to the accelerations, acquiring a dynamic attribute and a coordinate when the obstacle vehicle has run for the running duration according to trajectories corresponding to the trajectory equations.

Specifically, for each running duration:
- $c_1$: determining that when the obstacle vehicle has run for the running duration, the obstacle vehicle is between a first key point and a second key point, and is running according to a target trajectory corresponding to a target trajectory equation between the first key point and the second key point, where the first key point and the second key point are two adjacent points among the y key points;
- $c_2$: determining a target duration for which the obstacle vehicle has run according to the target trajectory;
- $c_3$: acquiring a speed of the obstacle vehicle when the obstacle vehicle has run for the running duration according to the speed of the obstacle vehicle at the first key point, the acceleration of the obstacle vehicle between the first key point and the second key point, and the above target duration;
- $c_4$: obtaining, according to the speed of the obstacle vehicle at the first key point and the above target duration, a target distance that the obstacle vehicle has run according to the target trajectory;
- $c_5$: acquiring a ratio of the target distance to a length of a target trajectory curve, where the length of the target trajectory curve is a length of a trajectory curve corresponding to the target trajectory equation;
- $c_6$: acquiring, according to the above ratio and the target trajectory equation, the coordinate of the obstacle vehicle when the obstacle vehicle has run for the running duration.

Specifically, the interval of multiple running durations may be 0.1 second(s), for example, the running durations may be 0s, 0.1s, 0.2s, 0.3s, ... , 1s, 1.1s, ... , T, that is, acquiring dynamic attributes and coordinates of the obstacle vehicle when running 0s, 0.1s, 0.2s, 0.3s, ... , 1s, 1.1s, ... , T. Where T is the duration that the obstacle vehicle runs from the first key point to the last key point according to the trajectories corresponding to the trajectory equations.

For $c_1$: if acquiring a dynamic attribute and a coordinate of the obstacle when the running duration of the obstacle vehicle is 1s, where the running duration between the first key point and the second key point is 0.5s, the running duration between the second key point and the third key point is 0.3s, and the running duration between the third key point and the fourth key point is 0.4s. When the obstacle vehicle has run for 1s, the obstacle vehicle is between the third key point and the fourth key point, and is currently running according to the trajectory between the third key point and the fourth key point, and the trajectory between the third key point and the fourth key point is the target trajectory of the obstacle vehicle, the third key point is the first key point, and the fourth key point is the second key point.

For $c_2$: determining the target duration for which the obstacle vehicle has run according to the above target trajectory t=1s-0.5s-0.3s=0.2s.

For $c_3$: If the speed of the third key point is v1, the acceleration of the obstacle vehicle between the third key point and the fourth key point is a1, then when the obstacle vehicle has run for 1s, the speed of the obstacle vehicle v=v1+a1×t.

For $c_4$: the target distance that the obstacle vehicle has run according to the above target trajectory is s=v1×t+0.5×a1×$t^2$.

For $c_5$: if the length of the target trajectory curve corresponding to the trajectory equation between the third key point and the fourth key point is L (i.e., $S_3$), then the ratio of the target distance to the length of the target trajectory curve is taken as r1=s/L.

For $c_6$: substituting r1 into the trajectory equation between the third key point and the fourth key point $Traj_3(r) = c_0^3 + c_1^3 r + c_2^3 r^2 + c_3^3 r^3$, when the obstacle vehicle has run for 1s, the coordinate of the obstacle vehicle $P = c_0^3 + c_1^3 r1 + c_2^3 (r1)^2 + c_3^3 (r1)^3$.

Further, the dynamic attribute may further include a track. If the obstacle vehicle has run for a duration of T1 (running duration), the coordinate of the obstacle vehicle is P1, and when the obstacle vehicle has run for a duration of T2 (running duration), the coordinate of the obstacle vehicle is P2, then between the running duration T1 and T2, the track of the obstacle vehicle during the time is P2-P1.

The dynamic attributes and coordinates of the obstacle vehicle can be obtained in the same manner as described above when the obstacle vehicle has run for other running durations.

According to the method for acquiring the track as described above, the track of the obstruction during the time between every two adjacent running durations can be acquired, where the above 0s, 0.1s are two adjacent running durations, 0.1s, 0.2s are two adjacent running durations, 0.2s, 0.3s are two adjacent running durations, and so on.

According to the above method, the dynamic attributes and coordinates of the obstacle vehicle when the obstacle vehicle has run according to the trajectories corresponding to the trajectory equations for different running durations are obtained, the dynamic attributes and coordinates of the obstacle vehicle when the obstacle vehicle has run for different running durations are the input data when performing the performance test of the unmanned vehicle, or the dynamic attributes and coordinates of the obstacle vehicle are the control amounts for the performance test of the unmanned vehicle when the obstacle vehicle has rung for different running durations.

In this implementation, by constructing an $n^{th}$ polynomial trajectory equation, n≥2, the direction of the speed of the obstacle vehicle during running can be continuously changed, and if the speeds of the obstacle vehicle at two adjacent key points are not the same, the acceleration of the obstacle vehicle between the two adjacent key points is a constant that is not 0, if the speeds of the obstacle vehicle at the two adjacent key points are the same, the acceleration of the obstacle vehicle between the two adjacent key points is 0, so that the magnitude of the speed of the obstacle vehicle can be continuously changed during the running, thus the dynamic attribute of the obstacle vehicle continuously changes, which is in accordance with the dynamic characteristics of the vehicle. The continuously changing dynamic attribute are used as the control amount in the performance test of the unmanned vehicle, therefore, false judgment on the perception and control of the unmanned vehicle rarely happens, and the reliability of the result of the performance test of the unmanned vehicle is improved.

Figure 5:
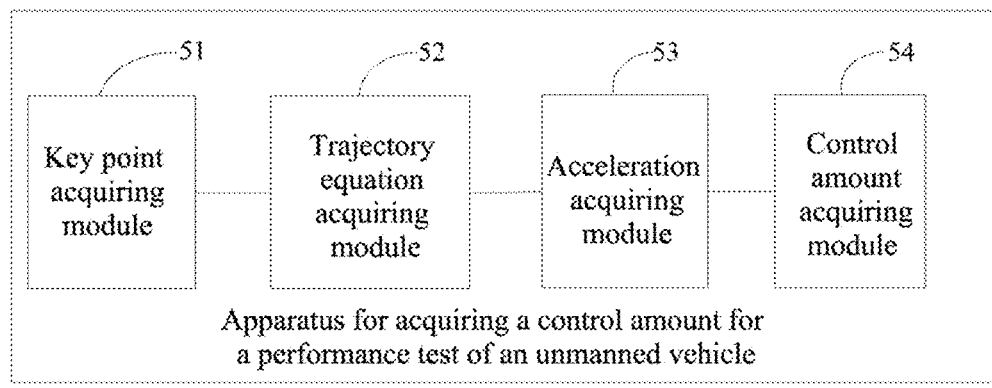
FIG. 5 is a schematic structural diagram 1 of an apparatus for acquiring a control amount for a performance test of an unmanned vehicle according to an embodiment of the present application.

FIG. 5 is a schematic structural diagram of an apparatus for acquiring a control amount for a performance test of an unmanned vehicle according to an embodiment of the present application. As shown in FIG. 5, the apparatus in this embodiment may include: a key point acquiring module 51 and a trajectory equation acquiring module 52, an acceleration acquiring module 53 and a control amount acquiring module 54;

the key point acquiring module 51, configured to acquire coordinates of y key points on the trajectory of the simulated obstacle vehicle and speeds at they key points, where y≥2;

the trajectory equation acquiring module 52, configured to acquire trajectory equations of the obstacle vehicle between every two adjacent key points according to the coordinates of the y key points, where the trajectory equation is an $n^{th}$ degree polynomial equation, n≥2;

the acceleration acquiring module 53, configured to acquire accelerations of the obstacle vehicle between every two adjacent key points according to the speeds at the y key points and the trajectory curves corresponding to the trajectory equations, if the speeds of the obstacle vehicle at two adjacent key points are not the same, the acceleration of the obstacle vehicle between the two adjacent key points is a constant that is not 0, if the speeds of the obstacle vehicle at the two adjacent key points are the same, the acceleration of the obstacle vehicle between the two adjacent key points is 0;

the control amount acquiring module 54, configured to, for each running duration, according to the accelerations, acquire a dynamic attribute and a coordinate when the obstacle vehicle has run for the running duration according to trajectories corresponding to the trajectory equations.

The apparatus in this embodiment may be used to implement the technical solution of the foregoing method embodiments, the implementation principle and the technical effect are similar, and details are not described herein again.

In a possible design, the trajectory equation acquiring module is specifically configured to:

acquire a first coordinate of a first shadow point of a first key point among the y key points, and a second coordinate of a second shadow point of a last key point among the y key points;

acquire the trajectory equations of the obstacle vehicle between every two adjacent key points according to the coordinates of the y key points, the first coordinate and the second coordinate.

In a possible design, the acceleration acquiring module is specifically configured to:

acquire lengths of the trajectory curves corresponding to the trajectory equations;

acquire running durations of the obstacle vehicle between every two adjacent key points according to the speeds of the obstacle vehicle at the y key points and the lengths of the trajectory curves;

acquire accelerations of the obstacle vehicle between every two adjacent key points according to the running durations and the speeds of the obstacle vehicle at the y key points.

In a possible design, if the dynamic attribute includes a speed, the control amount acquiring module is specifically configured to:

for each running duration, determine that when the obstacle vehicle has run for the running duration, the obstacle vehicle is between a first key point and a second key point, and is running according to a target trajectory corresponding to a target trajectory equation between the first key point and the second key point, where the first key point and the second key point are two adjacent points among the y key points;

determine a target duration for which the obstacle vehicle has run according to the target trajectory;

acquire a speed of the obstacle vehicle when the obstacle vehicle has run for the running duration according to the speed of the obstacle vehicle at the first key point, the acceleration between the first key point and the second key point, and the target duration.

In a possible design, the control amount acquiring module is further specifically configured to:

obtain, according to the speed of the obstacle vehicle at the first key point and the target duration, a target distance that the obstacle vehicle has run according to the target trajectory;

acquire a ratio of the target distance to a length of a target trajectory curve, where the length of the target trajectory curve is a length of a trajectory curve corresponding to the target trajectory equation;

acquire, according to the ratio and the target trajectory equation, the coordinate of the obstacle vehicle when the obstacle vehicle has run for the running duration.

In a possible design, the trajectory equation between the x-th key point and the (x+1)-th key point is:

$$Traj_x(r)=c_0^x+c_1^x r+c_2^x r^2+c_3^x r^3$$

where, r represents a running ratio, and the running ratio is the ratio of the distance that the obstacle vehicle has run according to the trajectory between the x-th key point and the (x+1)-th key point to a length of the trajectory curve corresponding to the trajectory of the obstacle vehicle between the x-th key point and the (x+1)-th key point, the x-th key point is adjacent to the (x+1)-th key point; $c_0^x=P_x$, $P_x$ is a coordinate of the x-th key point, $c_1^x=\delta \times P_{x-1}+\delta \times P_{x+1}$, $P_{x-1}$ is the coordinate of the (x−1)-th key point, $P_{x+1}$ is a coordinate of the (x+1)-th key point, $c_2^x=2\delta \times P_{x-1}-(3-\delta)\times P_x+(3-2\delta)\times P_{x+1}-\delta \times P_{x+2}$, $P_{x+2}$ is a coordinate of the (x+2)-th key point, and δ is a tension coefficient, 0<δ<1; $P_0$ is the first coordinate, $P_{y+1}$ is the second coordinate, x=1, 2 . . . , y−1.

In a possible design, the acceleration acquiring module 53 is specifically configured to: for every two adjacent key points: determine h sampling points on the trajectory curve corresponding to the trajectory equation between the two adjacent key points;

acquire straight line distances between adjacent sampling points;

obtain the length of the trajectory curve corresponding to the trajectory equation between the two adjacent key points according to a sum of the straight line distances.

In a possible design, the acceleration acquiring module 53 is specifically configured to:

acquire the running durations of the obstacle vehicle between every two adjacent key points from the following formula:

$$T_x=(2\times S_x)/(u_x+u_{x+1})$$

where $T_x$ is the running duration of the obstacle vehicle between the x-th key point and the (x+1)-th key point, the x-th key point is adjacent to the (x+1)-th key point; $S_x$ is the length of the trajectory curve corresponding to the trajectory equation between the x-th key point and the (x+1)-th key point, $u_x$ is the speed of the obstacle vehicle at the x-th key point, and $u_{x+1}$ is the speed of the obstacle vehicle at the (x+1)-th key point, x=1, 2, . . . y−1.

In a possible design, the acceleration acquiring module 53 is specifically configured to:

acquire the accelerations of the obstacle vehicle between every two adjacent key points from the following formula:

$$a_x=(u_{x+1}-u_x)/T_x$$

where $a_x$ is the acceleration of the obstacle vehicle between the x-th key point and the (x+1)-th key point, the x-th key point is adjacent to the (x+1)-th key point, and $T_x$ is the running duration of the obstacle vehicle between the x-th key point and the (x+1)-th key point, $u_{x+1}$ is the speed of the obstacle vehicle at the (x+1)-th key point, and $u_x$ is the speed of the obstacle vehicle at the x-th key point, x=1, 2, . . . y−1.

In a possible design, the trajectory equation acquiring module 52 includes:

obtaining the first coordinate according to a coordinate of the first key point and a coordinate of the second key point;

where the acquiring the second coordinate of the second shadow point of the last key point among the y key points includes:

obtaining the second coordinate according to a coordinate of the last key point and a coordinate of a second to last key point.

The apparatus in this embodiment may be used to implement the technical solution of the foregoing method embodiments, the implementation principle and the technical effect are similar, and details are not described herein again.

The embodiments of the present application further provide a non-volatile computer readable storage medium, where a computer program is stored in the non-volatile computer readable storage medium, and the computer program is executed by a processor to perform the method according to the foregoing method embodiments.

Figure 6:
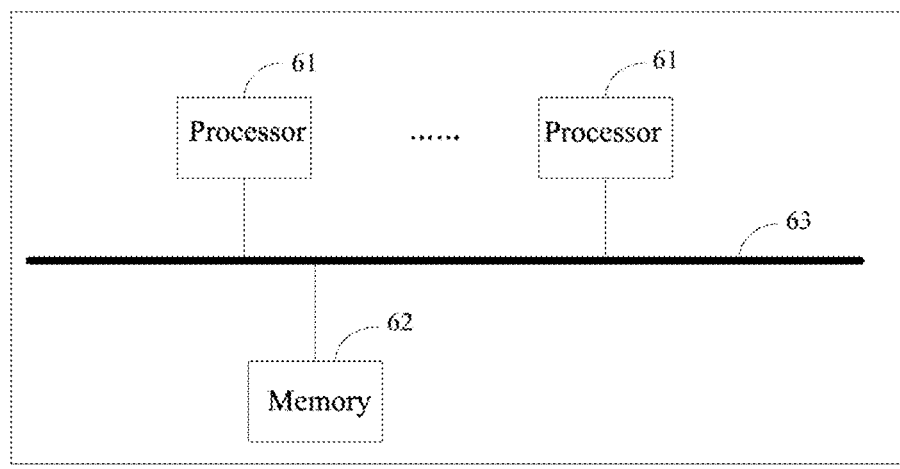
FIG. 6 is a schematic structural diagram 2 of an apparatus for acquiring a control amount for a performance test of an unmanned vehicle according to an embodiment of the present application.

FIG. 6 is a schematic structural diagram 2 of an apparatus for acquiring a control amount for a performance test of an unmanned vehicle according to an embodiment of the present application, including a processor 61, a memory 62, and a communication bus 63. The communication bus 63 is used for connecting the processor 61 and the memory 62, where:

the memory 61, configured to store a program;

the processor 62, configured to execute the program stored in the memory, the processor is configured to perform the method in the foregoing method embodiment when the program is executed.

It will be understood by those skilled in the art that all or part of the steps of implementing the above method embodiments may be performed by hardware related to the program instructions. The aforementioned program can be stored in a non-volatile computer readable storage medium. The program, when executed, performs the steps including the foregoing method embodiments; and the foregoing storage medium includes: various media that can store program codes, such as a ROM, a RAM, a magnetic disk, or an optical disk.

It should be noted that the above embodiments are only used to explain the technical solution of the present application and shall not be construed as limitation; although the present application has been described in detail with reference to the foregoing embodiments, those skilled in the art will understand that the technical solutions described in the foregoing embodiments may be modified, or some or all of the technical features may be equivalently replaced; and the modifications or substitutions do not deviate from the scope of the technical solutions of the embodiments of the present application.

What is claimed is:

1. A method for performing a performance test of an unmanned vehicle, comprising:
    acquiring coordinates of y key points on a trajectory of a simulated obstacle vehicle and speeds at the y key points, wherein y≥2;
    acquiring trajectory equations of the obstacle vehicle between every two adjacent key points according to the coordinates of the y key points, wherein the trajectory equation is an $n^{th}$ degree polynomial equation, and n is greater or equal to 2 to ensure that a direction of a speed of the obstacle vehicle during running changes continuously;
    acquiring accelerations of the obstacle vehicle between every two adjacent key points according to the speeds at the y key points and trajectory curves corresponding to the trajectory equations, if the speeds of the obstacle vehicle at two adjacent key points are not the same, the acceleration of the obstacle vehicle between the two adjacent key points is a constant that is not 0, if the speeds of the obstacle vehicle at the two adjacent key points are the same, the acceleration of the obstacle vehicle between the two adjacent key points is 0, wherein a magnitude of the speed of the obstacle vehicle changes continuously during the running;
    for each running duration among a plurality of running durations, according to the acquired accelerations, acquiring a dynamic attribute and a coordinate of a point at which the obstacle vehicle has arrived when running for the running duration along the trajectory curves, wherein the point is between two adjacent key points; and
    performing the performance test of the unmanned vehicle according to the acquired dynamic attributes and the acquired coordinates corresponding to the plurality of running durations, and the speeds at the y key points and the coordinates of the y key points.

2. The method according to claim 1, wherein the acquiring trajectory equations of the obstacle vehicle between every two adjacent key points according to the coordinates of the y key points comprises:
    acquiring a first coordinate of a first shadow point of a first key point among the y key points, and a second coordinate of a second shadow point of a last key point among the y key points;
    acquiring the trajectory equations of the obstacle vehicle between every two adjacent key points according to the coordinates of the y key points, the first coordinate and the second coordinate.

3. The method according to claim 1, wherein the acquiring accelerations of the obstacle vehicle between every two adjacent key points according to the speeds at the y key points and trajectory curves corresponding to the trajectory equations comprises:
    acquiring lengths of the trajectory curves corresponding to the trajectory equations;
    acquiring running durations of the obstacle vehicle between every two adjacent key points according to the speeds of the obstacle vehicle at the y key points and the lengths of the trajectory curves;
    acquiring accelerations of the obstacle vehicle between every two adjacent key points according to the running durations and the speeds of the obstacle vehicle at the y key points.

4. The method according to claim 1, wherein, if the dynamic attribute comprises a speed, the for each running duration among the plurality of running durations, according to the acquired accelerations, acquiring a dynamic attribute of the point at which the obstacle vehicle has arrived when running for the running duration along the trajectory curves comprises:
    for each running duration, determining that, when the obstacle vehicle has run for the running duration, the obstacle vehicle is between a first key point and a second key point and is running according to a target trajectory curve corresponding to a target trajectory equation between the first key point and the second key point, wherein the first key point and the second key point are two adjacent points among the y key points;
    determining a target duration for which the obstacle vehicle has run according to the target trajectory curve;
    acquiring a speed of the obstacle vehicle when the obstacle vehicle has run for the running duration according to the speed of the obstacle vehicle at the first key point, the acceleration between the first key point and the second key point, and the target duration.

5. The method according to claim 4, wherein the for each running duration among the plurality of running durations, according to the acquired accelerations, acquiring a coordinate of the point at which the obstacle vehicle has arrived when running for the running duration along the trajectory curves comprises:
    obtaining, according to the speed of the obstacle vehicle at the first key point and the target duration, a target distance that the obstacle vehicle has run according to the target trajectory curve;
    acquiring a ratio of the target distance to a length of a target trajectory curve, wherein the length of the target trajectory curve is a length of a trajectory curve corresponding to the target trajectory equation;
    acquiring, according to the ratio and the target trajectory equation, the coordinate of the obstacle vehicle when the obstacle vehicle has run for the running duration.

6. The method according to claim 2, wherein the trajectory equation between an x-th key point and an (x+1)-th key point is:

$$\text{Traj}_x(r) = c_0^x + c_1^x r + c_2^x r^2 + c_3^x r^3$$

wherein, r represents a running ratio, and the running ratio is a ratio of a distance that the obstacle vehicle has run according to the trajectory between the x-th key point and the (x+1)-th key point to a length of the trajectory curve corresponding to the trajectory of the obstacle vehicle between the x-th key point and the (x+1)-th key point, the x-th key point is adjacent to the (x+1)-th key point, $c_0^x = P_x$, $P_x$ is a coordinate of the x-th key point, $c_1^x = -\delta \times P_{x-1} + \delta \times P_{x+1}$, $P_{x-1}$ is a coordinate of the (x−1)-th key point, $P_{x+1}$ is a coordinate of the (x+1)-th key point, $c_2^x = 2\delta \times P_{x-1} - (3-\delta) \times P_x + (3-2\delta) \times P_{x+1} - \delta \times P_{x+2}$, $P_{x+2}$ is a coordinate of the (x+2)-th key point, $c_3^x = -\delta \times P_{x+1} + (2-\delta) \times P_x - (2-\delta) \times P_{x+1} + \delta \times P_{x+2}$ and $\delta$ is a tension coefficient, $0 < \delta < 1$; $P_0$ is the first coordinate, $P_{y+1}$ is the second coordinate, x=1, 2 ..., y−1.

7. The method according to claim 3, wherein the acquiring lengths of the trajectory curves corresponding to the trajectory equations comprises:
for every two adjacent key points: determining h sampling points on the trajectory curve corresponding to the trajectory equation between the two adjacent key points;
acquiring straight line distances between adjacent sampling points;
obtaining a length of the trajectory curve corresponding to the trajectory equation between the two adjacent key points according to a sum of the straight line distances.

8. The method according to claim 3, wherein the acquiring running durations of the obstacle vehicle between every two adjacent key points according to the speeds of the obstacle vehicle at the y key points and the lengths of the trajectory curves, comprises:
acquiring the running durations of the obstacle vehicle between every two adjacent key points from the following formula:

$$T_x = (2 \times S_x)/(u_x + u_{x+1})$$

wherein $T_x$ is the running duration of the obstacle vehicle between the x-th key point and the (x+1)-th key point, the x-th key point is adjacent to the (x+1)-th key point; $S_x$ is the length of the trajectory curve corresponding to the trajectory equation between the x-th key point and the (x+1)-th key point, $u_x$ is the speed of the obstacle vehicle at the x-th key point, and $u_{x+1}$ is the speed of the obstacle vehicle at the (x+1)-th key point, x=1, 2, ... y−1.

9. The method according to claim 3, wherein the acquiring accelerations of the obstacle vehicle between every two adjacent key points according to the running durations and the speeds of the obstacle vehicle at the y key points comprises:
acquiring the accelerations of the obstacle vehicle between every two adjacent key points from the following formula:

$$a_x = (u_{x+1} - u_x)/T_x$$

wherein $a_x$ is the acceleration of the obstacle vehicle between the x-th key point and the (x+1)-th key point, the x-th key point is adjacent to the (x+1)-th key point, and $T_x$ is the running duration of the obstacle vehicle between the x-th key point and the (x+1)-th key point, $u_{x+1}$ is the speed of the obstacle vehicle at the (x+1)-th key point, and $u_x$ is the speed of the obstacle vehicle at the x-th key point, x=1, 2, ... y−1.

10. The method according to claim 2, wherein the acquiring a first coordinate of a first shadow point of a first key point among the y key points comprises:
obtaining the first coordinate according to a coordinate of the first key point and a coordinate of the second key point;

wherein the acquiring the second coordinate of the second shadow point of the last key point among the y key points comprises:
obtaining the second coordinate according to a coordinate of the last key point and a coordinate of a second to last key point.

11. An apparatus for performing a performance test of an unmanned vehicle, comprising a processor and a memory having executable instructions stored thereon that when executed by the processor cause the processor to:
acquire coordinates of y key points on a trajectory of a simulated obstacle vehicle and speeds at the y key points, wherein y≥2;
acquire trajectory equations of the obstacle vehicle between every two adjacent key points according to the coordinates of the y key points, where the trajectory equation is an $n^{th}$ degree polynomial equation, and n is greater or equal to 2 to ensure that a direction of a speed of the obstacle vehicle during running changes continuously;
acquire accelerations of the obstacle vehicle between every two adjacent key points according to the speeds at the y key points and the trajectory curves corresponding to the trajectory equations, if the speeds of the obstacle vehicle at two adjacent key points are not the same, the acceleration of the obstacle vehicle between the two adjacent key points is a constant that is not 0, if the speeds of the obstacle vehicle at the two adjacent key points are the same, the acceleration of the obstacle vehicle between the two adjacent key points is 0, wherein a magnitude of the speed of the obstacle vehicle changes continuously during the running;
for each running duration among a plurality of running durations, according to the acquired accelerations, acquire a dynamic attribute and a coordinate of a point at which the obstacle vehicle has arrived when running for the running duration along the trajectory curves, wherein the point is between two adjacent key points; and
perform the performance test of the unmanned vehicle according to the acquired dynamic attributes and the acquired coordinates corresponding to the plurality of running durations, and the speeds at the y key points and the coordinates of the y key points.

12. The apparatus according to claim 11, wherein the processor is configured to:
acquire a first coordinate of a first shadow point of a first key point among the y key points, and a second coordinate of a second shadow point of a last key point among the y key points;
acquire the trajectory equations of the obstacle vehicle between every two adjacent key points according to the coordinates of the y key points, the first coordinate and the second coordinate.

13. The apparatus according to claim 11, wherein the processor is configured to:
acquire lengths of the trajectory curves corresponding to the trajectory equations;
acquire running durations of the obstacle vehicle between every two adjacent key points according to the speeds of the obstacle vehicle at the y key points and the lengths of the trajectory curves;
acquire accelerations of the obstacle vehicle between every two adjacent key points according to the running durations and the speeds of the obstacle vehicle at the y key points.

14. The apparatus according to claim 11, wherein, if the dynamic attribute comprises a speed, the processor is configured to:
- for each running duration, determine that, when the obstacle vehicle has run for the running duration, the obstacle vehicle is between a first key point and a second key point and is running according to a target trajectory curve corresponding to a target trajectory equation between the first key point and the second key point, where the first key point and the second key point are two adjacent points among the y key points;
- determine a target duration for which the obstacle vehicle has run according to the target trajectory curve;
- acquire a speed of the obstacle vehicle when the obstacle vehicle has run for the running duration according to the speed of the obstacle vehicle at the first key point, the acceleration between the first key point and the second key point, and the target duration.

15. The apparatus according to claim 14, wherein the processor is further configured to:
- obtain, according to the speed of the obstacle vehicle at the first key point and the target duration, a target distance that the obstacle vehicle has run according to the target trajectory curve;
- acquire a ratio of the target distance to a length of a target trajectory curve, wherein the length of the target trajectory curve is a length of a trajectory curve corresponding to the target trajectory equation;
- acquire, according to the ratio and the target trajectory equation, the coordinate of the obstacle vehicle when the obstacle vehicle has run for the running duration.

16. A non-transitory computer readable storage medium, wherein a computer program is stored in the non-volatile computer readable storage medium, and the computer program when executed, implements:
- acquiring coordinates of y key points on a trajectory of a simulated obstacle vehicle and speeds at the y key points, wherein y≥2;
- acquiring trajectory equations of the obstacle vehicle between every two adjacent key points according to the coordinates of the y key points, wherein the trajectory equation is an $n^{th}$ degree polynomial equation, and n is greater or equal to 2 to ensure that a direction of a speed of the obstacle vehicle during running changes continuously;
- acquiring accelerations of the obstacle vehicle between every two adjacent key points according to the speeds at the y key points and trajectory curves corresponding to the trajectory equations, if the speeds of the obstacle vehicle at two adjacent key points are not the same, the acceleration of the obstacle vehicle between the two adjacent key points is a constant that is not 0, if the speeds of the obstacle vehicle at the two adjacent key points are the same, the acceleration of the obstacle vehicle between the two adjacent key points is 0, wherein a magnitude of the speed of the obstacle vehicle changes continuously during the running;
- for each running duration among a plurality of running durations, according to the acquired accelerations, acquiring a dynamic attribute and a coordinate of a point at which the obstacle vehicle has arrived when running for the running duration along the trajectory curves, wherein the point is between two adjacent key points; and
- performing the performance test of the unmanned vehicle according to the acquired dynamic attributes and the acquired coordinates corresponding to the plurality of running durations, and the speeds at the y key points and the coordinates of the y key points.

17. The non-transitory computer storage medium according to claim 16, wherein the computer program, when executed, further implements:
- acquiring a first coordinate of a first shadow point of a first key point among the y key points, and a second coordinate of a second shadow point of a last key point among the y key points;
- acquiring the trajectory equations of the obstacle vehicle between every two adjacent key points according to the coordinates of the y key points, the first coordinate and the second coordinate.

18. The non-transitory computer storage medium according to claim 16, wherein the computer program, when executed, further implements:
- acquiring lengths of the trajectory curves corresponding to the trajectory equations;
- acquiring running durations of the obstacle vehicle between every two adjacent key points according to the speeds of the obstacle vehicle at the y key points and the lengths of the trajectory curves;
- acquiring accelerations of the obstacle vehicle between every two adjacent key points according to the running durations and the speeds of the obstacle vehicle at the y key points.

19. The non-transitory computer storage medium according to claim 16, wherein the computer program, when executed, further implements:
- for each running duration, determining that, when the obstacle vehicle has run for the running duration, the obstacle vehicle is between a first key point and a second key point and is running according to a target trajectory curve corresponding to a target trajectory equation between the first key point and the second key point, wherein the first key point and the second key point are two adjacent points among the y key points;
- determining a target duration for which the obstacle vehicle has run according to the target trajectory curve;
- acquiring a speed of the obstacle vehicle when the obstacle vehicle has run for the running duration according to the speed of the obstacle vehicle at the first key point, the acceleration between the first key point and the second key point, and the target duration.

20. The non-transitory computer storage medium according to claim 19, wherein the computer program, when executed, further implements:
- obtaining, according to the speed of the obstacle vehicle at the first key point and the target duration, a target distance that the obstacle vehicle has run according to the target trajectory curve;
- acquiring a ratio of the target distance to a length of a target trajectory curve, wherein the length of the target trajectory curve is a length of a trajectory curve corresponding to the target trajectory equation;
- acquiring, according to the ratio and the target trajectory equation, the coordinate of the obstacle vehicle when the obstacle vehicle has run for the running duration.

* * * * *